United States Patent
Bonigen

(10) Patent No.: US 12,037,107 B2
(45) Date of Patent: Jul. 16, 2024

(54) AIRCRAFT BRAKING METHOD COMPRISING A DYNAMIC CORRECTION OF THE BRAKING COMMAND

(71) Applicant: SAFRAN LANDING SYSTEMS, Velizy Villacoublay (FR)

(72) Inventor: François Bonigen, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 135 days.

(21) Appl. No.: 17/775,112

(22) PCT Filed: Nov. 5, 2020

(86) PCT No.: PCT/EP2020/081162
§ 371 (c)(1),
(2) Date: May 6, 2022

(87) PCT Pub. No.: WO2021/089714
PCT Pub. Date: May 14, 2021

(65) Prior Publication Data
US 2022/0388637 A1    Dec. 8, 2022

(30) Foreign Application Priority Data

Nov. 7, 2019   (FR) ...................................... 1912531

(51) Int. Cl.
*B64C 25/44*    (2006.01)
*B60T 8/17*    (2006.01)
(Continued)

(52) U.S. Cl.
CPC ............ *B64C 25/44* (2013.01); *B60T 8/1703* (2013.01); *B60T 8/325* (2013.01); *B64C 25/426* (2013.01)

(58) Field of Classification Search
CPC .......... B64C 25/44; B60T 8/1703; B60T 8/325
See application file for complete search history.

(56) References Cited

U.S. PATENT DOCUMENTS

| 5,968,106 A * | 10/1999 | DeVlieg | B64C 25/426 701/16 |
| 7,110,873 B2 * | 9/2006 | Rudd, III | B60T 8/17616 303/155 |
| 2015/0088371 A1 * | 3/2015 | Kanemori | B64C 25/42 701/33.9 |

FOREIGN PATENT DOCUMENTS

| EP | 2 853 487 A1 | 4/2015 |
| FR | 3 008 368 A1 | 1/2015 |
| WO | 2015/025131 A1 | 2/2015 |

OTHER PUBLICATIONS

International Search Report for PCT/EP2020/081162, dated Jan. 22, 2021.

* cited by examiner

*Primary Examiner* — Richard G Davis
(74) *Attorney, Agent, or Firm* — Sughrue Mion, PLLC

(57) ABSTRACT

Method for braking at least one wheel of an aircraft, the wheel being provided with a brake having at least one braking actuator, comprising the steps of:
   generating a braking command ($C_{om}$) on the basis of a braking setpoint ($C_f$);
   estimating a wheel speed;
   applying a dynamic correction to the braking command, the dynamic correction being a function of the braking command and of the wheel speed (V(t)), the dynamic correction comprising the step of producing a corrected braking command ($C_{corr}$) which is greater than the braking command when the wheel speed is greater than or equal to a predetermined speed threshold, and then the step of reducing the correct braking command when (Continued)

the wheel speed becomes less than the predetermined speed threshold, with the result that the corrected braking command becomes less than the braking command.

10 Claims, 4 Drawing Sheets

(51) Int. Cl.
    *B60T 8/32*     (2006.01)
    *B64C 25/42*     (2006.01)

AIRCRAFT BRAKING METHOD COMPRISING A DYNAMIC CORRECTION OF THE BRAKING COMMAND

CROSS REFERENCE TO RELATED APPLICATIONS

This application is a National Stage of International Application No. PCT/EP2020/081162 filed Nov. 5, 2020, claiming priority based on French Patent Application No. 1912531 filed Nov. 7, 2019, the contents of each of which being herein incorporated by reference in their entireties.

The invention relates to the field of aircraft braking methods, comprising a dynamic correction of the braking command.

BACKGROUND OF THE INVENTION

A modern aircraft, for example an aeroplane or a helicopter, conventionally has a ground braking system of certain so-called "braked" wheels of the aircraft. The braking system comprises one or more braking computers which equip one of the braked wheels.

Each brake comprises at least one friction member, made for example of steel or carbon, and one or more braking actuators which are hydraulic actuators (a "hydraulic braking system" is thus referred to) or electromechanical actuators (an "electric braking system" is thus referred to).

In the case of an aeroplane, each brake generally comprises several actuators and a stack of carbon disks.

In the case of a helicopter, patent FR 3 007 096 B1 describes a brake with one single disk rotating with the braking wheel, the disk being associated with a calliper which overlaps the disk and the jaws of which receive two pads, one of which is movably mounted to be able to clamp the disk between the two pads by means of one single braking actuator.

When a pilot of the aircraft presses on a brake pedal located in the cockpit, it produces a so-called manual braking setpoint which depends on the deflexion depression conferred to the brake pedal. This manual braking setpoint is transmitted to the braking computer which generates a manual braking command on the basis of the manual braking setpoint.

Likewise, when the braking is commanded by an automatic braking function, an automatic braking setpoint is transmitted to the braking computer which generates an automatic braking command.

The braking command, manual or automatic, is used to control the braking actuators with the result that each brake exerts on the associated braking wheel, a braking torque which brakes the braking wheel and thus slows down the aircraft.

OBJECT OF THE INVENTION

The object of the invention is to optimise the braking command, with the aim of limiting the risks of damaging the structure of the brakes while maintaining the overall expected braking performance.

SUMMARY OF THE INVENTION

In view of achieving this aim, a method for braking at least one wheel of an aircraft is proposed, the wheel being provided with a brake having at least one braking actuator, comprising the steps of:

generating a braking command on the basis of a braking setpoint;
estimating and/or measuring a wheel speed;
applying a dynamic correction to the braking command, the dynamic correction being a function of the braking command and of the wheel speed, the dynamic correction comprising the step of producing a corrected braking command greater than the braking command when the wheel speed is greater than or equal to a predetermined speed threshold, and then the step of reducing the corrected braking command when the wheel speed becomes less than the predetermined speed threshold, with the result that the correct braking command becomes less than the braking command;
controlling the braking actuator of the brake of the wheel by using the correct braking command.

Extensive analyses, performed on the basis of the results of very numerous braking tests, have made it possible to observe that, during braking, when a constant braking command is used, the level of the braking torque actually exerted by the brake on the wheel is directly linked to the wheel speed. The braking torque actually exerted by the brake on the wheel is greater at low speed and lesser at high speed.

Thus, at high speed, the performances of the braking methods of the prior art are not optimal, and at low speed, there is a risk of damaging brake equipment.

On the contrary, in the braking method according to the invention, a dynamic correction is applied which depends on the braking command and on the wheel speed. The dynamic correction makes it possible to compensate for the braking command at high speed, and therefore to improve the braking performances, and to limit the braking command at low speed, and therefore to increase the service life of the brakes of the aircraft and to reduce the risk of damaging the structure of the brakes, in particular that of the rotor.

In addition, a braking method is proposed such as that which has just been described, wherein the dynamic correction consists of multiplying the braking command by a correction coefficient which depends on the braking command and on the wheel speed.

In addition, a braking method is proposed, such as that which has just been described, wherein, for a given braking command, when the wheel speed is greater than or equal to the predetermined speed threshold, the correction coefficient has a constant value which depends only on the given braking command.

Furthermore, a braking method is proposed, such as that which has just been described, wherein the constant value is an increasing function of the braking command.

In addition, a braking method is proposed, such as that which has just been described, wherein the correction coefficient is limited by a minimum correction coefficient and by a maximum correction coefficient.

Also, a braking method is proposed, such as that which has just been described, wherein, for a given braking command, when the wheel speed is less than the predetermined speed threshold, the correction coefficient is an increasing linear function of the wheel speed.

In addition, a braking method is proposed, such as that which has just been described, wherein the slope of the linear function is an increasing function of the braking command.

Furthermore, a braking method is proposed, such as that which has just been described, wherein a value of the correction coefficient, at zero wheel speed, is a decreasing function of the braking command.

In addition, a braking method is proposed, such as that which has just been described, wherein, whatever the braking command, the linear function passes through one same point defined by a predefined wheel speed value and a predefined coefficient value.

In addition, a braking method is proposed, such as that which has just been described, wherein the predefined coefficient value is equal to 1.

The invention will be best understood in the light of the following description of a particular non-limiting embodiment of the invention.

BRIEF DESCRIPTION OF THE DRAWINGS

Reference will be made to the accompanying drawings, among which.

DETAILED DESCRIPTION OF THE INVENTION

In the scope of developing a novel electric braking system for a helicopter, numerous braking tests have been performed, and particularly extensive analyses have been performed on the results of these tests.

Figure 1:
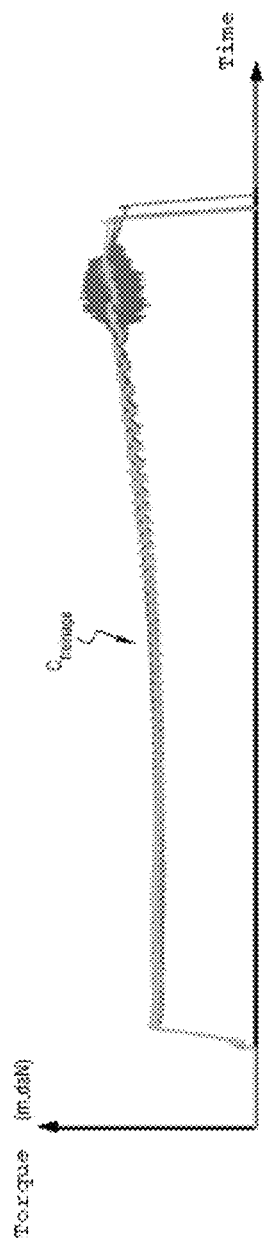
FIG. 1 is a graph comprising braking torque curves as a function of time.

In reference to FIG. 1, these analyses have made it possible to observe that, during braking, when a constant braking force command (manual or automatic) is used to control the braking actuator of the brake of a wheel, the braking torque $C_{freinage}$ actually exerted by the brake increases during braking.

Figure 2:
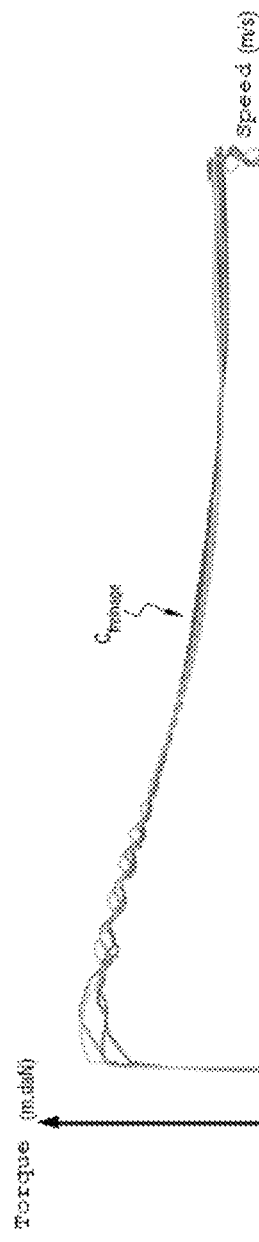
FIG. 2 is a graph comprising braking torque curves as a function of the speed of a wheel.

In reference to FIG. 2, these analyses have also made it possible to show that the level of the braking torque $C_{freinage}$ actually exerted is directly linked to the wheel speed. The braking torque actually exerted by the brake on the wheel is greater at low speed and lower at high speed. This evolution of the braking torque conveys a variation of the braking effectiveness coefficient "μ" as a function of the speed.

The variation of the braking torque during braking with constant braking force command is not optimal.

Indeed, at high speed, the average braking torque observed is constant but far from the maximum admissible braking torque. A greater braking force would make it possible to use the remaining margin and to increase the braking performances. At low speed, the average braking torque increases when the wheel speed decreases, and can become greater than the maximum admissible braking torque. This situation risks causing the breaking of a structural component of the brake. The greater the braking force command is, the more the risk increases.

Figure 3:
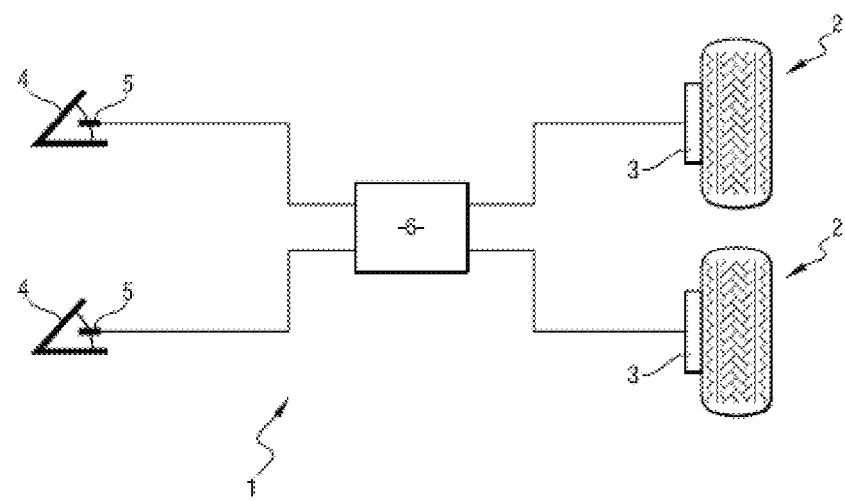
FIG. 3 represents an electric braking system wherein the braking method according to the invention is implemented.

In reference to FIG. 3, the invention is here implemented in an electric braking system 1 of a helicopter, with the aim of optimising the braking torque to reduce the risk of damaging the structure of the brake, and to maintain the desired performance level.

The helicopter comprises two front wheels and two main wheels. The two main wheels are braked wheels 2.

The electric braking system 1 comprises two brakes 3 each associated with one of the wheels 2.

Each brake 3 comprises a braking actuator which is an electromechanical actuator, as well as a disk, a calliper, and pads. The braking actuator acts on a movable pad to clamp the disk between the two pads.

Each brake 3 thus produces a braking torque to brake the associated wheel 2.

The braking can be commanded by brake pedals 4 located in the cockpit of the helicopter. Each brake pedal 4 is connected to a depression sensor 5 which measures a deflexion of the associated brake pedal 4.

The electric braking system 1 in addition comprises a braking computer 6 which is connected to the depression sensors 5.

Figures 4, 5:
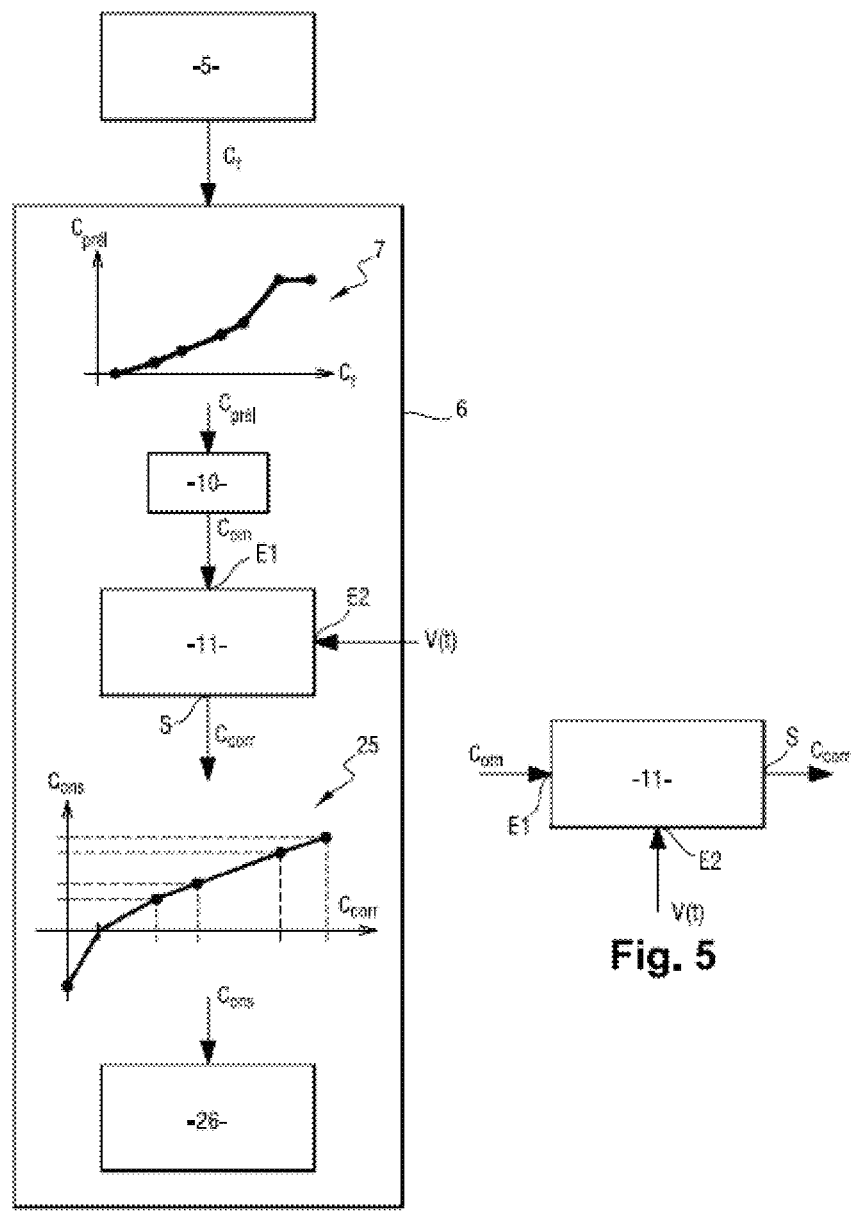
FIG. 4 represents steps of the braking method according to the invention.
FIG. 5 represents a limiting/compensating functional unit.

Now, the braking method according to the invention is described in more detail, in reference to FIGS. 4 and 5.

When a helicopter pilot presses on a brake pedal 4 to brake the helicopter, the associated depression sensor 5 measures a deflexion of the brake pedal 4 and thus produces a braking setpoint $C_f$.

The braking computer 6 acquires the braking setpoint $C_f$ and generates, on the basis of the braking setpoint $C_f$, a preliminary braking command $C_{prél}$ for the brake 3 of a wheel 2. The preliminary braking command $C_{prél}$ is here a force command.

As can be seen in FIG. 4, the preliminary braking command $C_{prél}$ depends on the braking setpoint $C_f$ (and therefore the measurement of the deflexion) according to a first predetermined curve 7.

The braking computer 6 performs processing on the preliminary braking command $C_{prél}$. The processing has the implementation of a plurality of functional units, which comprise, in particular, a slope limiter 10 and a limiter/compensator 11.

The preliminary braking command $C_{prél}$ is applied to an input of the slope limiter 10. The slope limiter 10 makes it possible to limit an occurring force peak, at the start of braking, at the time of applying the braking force by the braking actuator.

A braking command $C_{om}$ is thus generated at the output of the slope limiter 10.

The braking command $C_{om}$ is thus applied on a first input E1 of the limiter/compensator 11. The limiter/compensator 11 comprises a second input E2 via which it acquires, in real time, a speed $V(t)$ of the wheel 2.

This speed $V(t)$ of the wheel 2 is here estimated on the basis of a measurement of the ground speed of the helicopter. Of course, the wheel speed 2 could be obtained differently, for example by directly measuring the wheel speed 2 thanks to a tachometer mounted on the wheel 2.

The limiter/compensator 11 applies a dynamic correction to the braking command $C_{om}$.

The dynamic correction aims to make sure that the brake 3 exerts on the wheel 2, in response to the braking command $C_{om}$, a braking torque which is actually constant, whatever the wheel speed 2.

The dynamic correction is a function of the braking command and of the wheel speed 2.

The dynamic correction consists, at the start of braking, when the speed $V(t)$ of the wheel 2 is greater than or equal to a predetermined speed threshold, of producing a corrected braking command $C_{corr}$ greater than the braking command $C_{om}$.

Then, when the speed $V(t)$ of the wheel 2 becomes less than the predetermined speed threshold, the dynamic correction consists of reducing the corrected braking command $C_{corr}$ with the result that the corrected braking command $C_{corr}$ becomes less than the braking command $C_{om}$.

The corrected braking command $C_{corr}$ is produced on the output S of the limiter/compensator 11.

The dynamic correction consists of multiplying the braking command $C_{om}$ by a correction coefficient $C_c$ which depends on the braking command $C_{om}$ and on the speed $V(t)$ of the wheel 2.

So, therefore:

$$C_{corr}=C_c(C_{om},V(t))\times C_{om},$$

where $C_{corr}$ is the corrected braking command, $C_{om}$ is the braking command, $V(t)$ is the wheel speed 2 and $C_c$ ($C_{om}$, $V(t)$) is the correction coefficient which depends on the braking command $C_{om}$ and on the speed $V(t)$ of the wheel 2.

Figure 6:
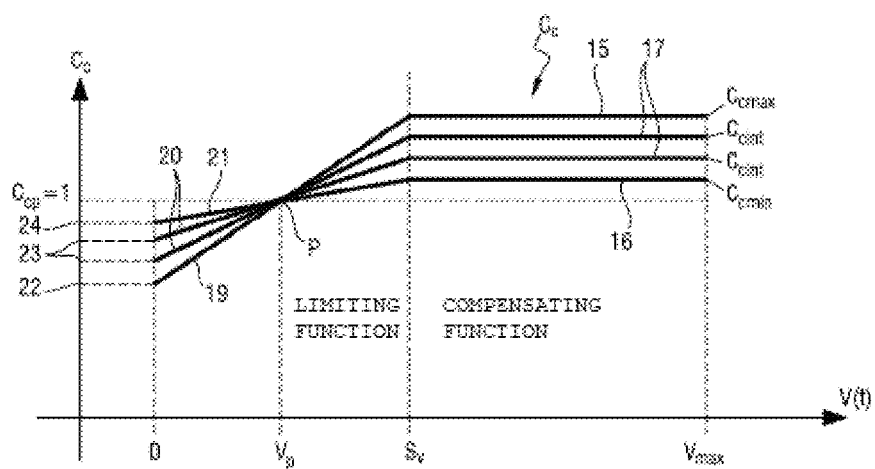
FIG. 6 is a graph comprising curves of a correction coefficient as a function of the wheel speed.

In reference to FIG. 6, for a given braking command $C_{om}$, when the speed $V(t)$ of the wheel 2 is greater than or equal to the predetermined speed threshold $S_v$, the correction coefficient $C_c$ has a constant value which depends only on the given braking command $C_{om}$. This constant value is an increasing function of the braking command $C_{om}$.

The curve portion 15 corresponds to a maximum braking command, the curve portion 16 to a minimum braking command, and the curve portions 17 to intermediate braking commands comprised between the maximum braking command and the minimum braking command. Here, the minimum braking command is the braking command below which the dynamic correction is not implemented, and the maximum braking command is the braking command above which the dynamic correction is not implemented.

It can be seen that the maximum correction coefficient $C_{cmax}$, corresponding to the maximum braking command, is greater than the intermediate correction coefficients $C_{cint}$, corresponding to the intermediate braking commands, which are themselves greater than the minimum correction coefficient $C_{min}$, corresponding to the minimum braking command.

The correction coefficient $C_c$ is therefore limited by the minimum correction coefficient $C_{cmin}$ and by the maximum correction coefficient $C_{cmax}$ which makes it possible to avoid a breakdown of the corrector leading to a too low or too high corrected braking command.

For a given braking command $C_{om}$, when the speed $V(t)$ of the wheel 2 is less than the predetermined speed threshold $S_v$, the correction coefficient $C_c$ is an increasing linear function of the wheel speed 2.

The slope of the linear function is an increasing function of the braking command $C_{om}$.

It is seen in FIG. 6 that the gradient of the linear function 19, corresponding to the maximum braking command, is greater than the slopes of the linear functions 20, corresponding to the intermediate braking commands, which are themselves greater than the gradient of the linear function 21, corresponding to the minimum braking command.

It is also noted that a value of the correction coefficient $C_c$, at zero speed $V(t)$, is a decreasing function of the braking command $C_{om}$.

Thus, the value 22 of the correction coefficient $C_c$ at zero speed $V(t)$, for the maximum braking command, is less than the values 23 of the correction coefficient $C_c$ at zero speed $V(t)$, for the intermediate braking commands, which are themselves less than the value 24 of the correction coefficient $C_c$ at zero speed $V(t)$, for the minimum braking command.

It is also seen that, whatever the braking command, the linear function 19, 20, 21 passes through one same point P defined by a predefined wheel speed value $V_p$ and a predefined correction coefficient value $C_{cp}$.

The predetermined speed threshold $S_v$ is, for example, equal to 11 m/s. The predetermined speed threshold can be impacted by the value of the braking command and by the predefined wheel speed value.

The predefined value of the correction coefficient $C_{cp}$ is here equal to 1.

The corrected braking command $C_{corr}$ is thus transformed into a position setpoint $C_{ons}$. The position setpoint $C_{ons}$ depends on the correct braking command according to a second predetermined curve 25. The position setpoint $C_{ons}$ is a linear position value of the pushbutton of the braking actuator of the brake 3 of the wheel 2. The braking computer 6 uses measurements of this linear position, provided by a position sensor located on the braking actuator, and implements an slaving 26 to command the linear position of the pushbutton of the braking actuator.

The braking computer 6 therefore controls the braking actuator of the brake 3 of the wheel 2 by using the corrected braking command $C_{corr}$.

It is noted here that the braking method according to the invention does not implement torque or force slaving. The braking command and the corrected braking command are force commands, but no torque or force measurement is taken. The braking method according to the invention does not therefore require any torque or force sensor.

It is also specified that the implementation of the technical solution has required two separate steps.

During a first step, the characterisation of numerous constant braking force command braking test datafiles has made it possible to build a modelling of the torque evolution as a function of the speed, and has made it possible to identify the speed threshold $S_v$. This modelling is independent from the initial braking speed.

Below $S_v$, the average torque increases as the speed decreases. This increase must therefore be limited, and a limiting function implemented.

Above $S_v$, the stability of the average torque is acceptable. However, the average torque is less than the overall average braking torque (due to the preceding phenomenon). It must therefore be increased to compensate for the decrease in performance due to the limiting function. Therefore, a compensating function is implemented.

During a second step, once the model is established, the correction coefficient has been built in order to be dynamically adapted to the wheel speed, but also to the braking command, as the compensation and/or limiting level to be applied is dependent on the request made by the pilot or the avionics.

Of course, the invention is not limited to the embodiment described, but comprises any variant entering into the field of the invention, such as defined by the claims.

Here, it is described that the braking computer produces a braking command sent to a wheel, and that the braking command is corrected according to a dynamic correction which is a function of the braking command and of the wheel speed. The braking command could, of course, be an overall command sent to several wheels. Likewise, the speed used could be a speed (measured or estimated) representative of the speed of several wheels (for example, an average of the speeds of these wheels).

The architecture of the braking system, wherein the invention is implemented, can of course be different from that presented here. The braking system is not necessarily an electric braking system, but could be, for example, a hydraulic braking system (in which case, the correction is, for example, made on the hydraulic pressure and not on a braking command intended to be transformed into a position setpoint).

The invention claimed is:

1. A method for braking at least one wheel of an aircraft, the at least one wheel being provided with a brake having at least one braking actuator, the method comprising:
generating a braking command on the basis of a braking setpoint;
estimating and/or measuring a wheel speed;
dynamically correcting the generated braking command, the dynamic correction being a function of the generated braking command and the wheel speed, the dynamic correction comprising:
producing a corrected braking command greater than the generated braking command when the wheel speed is greater than or equal to a speed threshold, and
reducing the corrected braking command when the wheel speed becomes less than the speed threshold, with the result that the corrected braking command becomes less than the generated braking command; and
controlling the braking actuator of the brake of the at least one wheel by using the corrected braking command.

2. The method according to claim 1, wherein the dynamic correction comprises multiplying the braking command by a correction coefficient which depends on the braking command and on the wheel speed.

3. The method according to claim 2, wherein, for a given braking command, when the wheel speed is greater than or equal to the speed threshold, the correction coefficient has a constant value which depends only on the given braking command.

4. The method according to claim 3, wherein the constant value is an increasing function of the braking command.

5. The method according to claim 2, wherein the correction coefficient is limited by a minimum correction coefficient and by a maximum correction coefficient.

6. The method according to claim 2, wherein, for a given braking command, when the wheel speed is less than the speed threshold, the correction coefficient is an increasing linear function of the wheel speed.

7. The method according to claim 6, wherein a slope of the linear function is an increasing function of the braking command.

8. The method according to claim 6, wherein a value of the correction coefficient, at zero wheel speed, is a decreasing function of the braking command.

9. The method according to claim 6, wherein, whatever the braking command, the linear function passes through one same point defined by a predefined wheel speed value and a predefined coefficient value.

10. The method according to claim 9, wherein the predefined coefficient value is equal to 1.

* * * * *